(12) United States Patent
Blough

(10) Patent No.: US 9,702,446 B2
(45) Date of Patent: Jul. 11, 2017

(54) TORQUE CONVERTER WITH PARALLEL TORSIONAL VIBRATION DAMPERS

(71) Applicant: Schaeffler Technologies GmbH & Co. KG, Herzogenaurach (DE)

(72) Inventor: Gregory Blough, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 182 days.

(21) Appl. No.: 14/567,452

(22) Filed: Dec. 11, 2014

(65) Prior Publication Data

US 2015/0198227 A1 Jul. 16, 2015

Related U.S. Application Data

(60) Provisional application No. 61/925,913, filed on Jan. 10, 2014.

(51) Int. Cl.
*F16H 45/02* (2006.01)
*F16F 15/14* (2006.01)

(52) U.S. Cl.
CPC ............ *F16H 45/02* (2013.01); *F16F 15/145* (2013.01); *F16H 2045/021* (2013.01); *F16H 2045/0215* (2013.01); *F16H 2045/0226* (2013.01); *F16H 2045/0231* (2013.01); *F16H 2045/0263* (2013.01)

(58) Field of Classification Search
CPC .................. F16H 2045/0215; F16H 2045/021
See application file for complete search history.

(56) References Cited

U.S. PATENT DOCUMENTS

| | | | |
|---|---|---|---|
| 6,070,704 A | 6/2000 | Sasse | |
| 7,044,279 B2 | 5/2006 | Leber | |
| 9,360,058 B2 * | 6/2016 | Jameson | F16D 33/18 |
| 2007/0181395 A1 | 8/2007 | Mueller et al. | |
| 2008/0149440 A1 | 6/2008 | Sturgin | |
| 2011/0099992 A1 | 5/2011 | Magerkurth et al. | |
| 2011/0192692 A1 * | 8/2011 | Werner | F16F 15/12353 |
| | | | 192/3.29 |
| 2011/0240432 A1 * | 10/2011 | Takikawa | F16H 45/02 |
| | | | 192/3.29 |
| 2013/0291528 A1 | 11/2013 | Strong et al. | |
| 2014/0262666 A1 * | 9/2014 | Ushio | F16H 45/02 |
| | | | 192/3.29 |
| 2014/0326564 A1 * | 11/2014 | Ushio | F16H 45/02 |
| | | | 192/3.28 |

* cited by examiner

*Primary Examiner* — Huan Le
*Assistant Examiner* — Lori Wu
(74) *Attorney, Agent, or Firm* — Chester Paul Maliszeski

(57) ABSTRACT

A torque converter, including: a cover for receiving torque; a pump non-rotatably connected to the cover; a turbine including a turbine shell; a turbine clutch including a portion of the turbine shell; a first torsional vibration damper including a first input plate non-rotatably connected to the turbine shell, a cover plate, an output flange arranged to non-rotatably connect to an input shaft for a transmission, and a plurality of springs, each spring in the plurality of springs engaged with the first input plate, the cover plate, or the output flange; a second torsional vibration damper including a second input plate, an output plate arranged to non-rotatably connect to the input shaft, and a spring engaged with the second input plate and the output plate; and a lock-up clutch including an axially displaceable piston plate arranged to non-rotatably connect the cover and the second input plate.

19 Claims, 2 Drawing Sheets

TORQUE CONVERTER WITH PARALLEL TORSIONAL VIBRATION DAMPERS

CROSS-REFERENCE TO RELATED APPLICATIONS

This application claims the benefit under 35 U.S.C. §119(e) of U.S. Provisional Patent Application No. 61/925,913, filed Jan. 10, 2014, which application is incorporated herein by reference in its entirety.

TECHNICAL FIELD

The present disclosure relates to a torque converter having parallel torsional vibration dampers and associated clutches. Via the associated clutches, torque is transmitted through the dampers singly or in parallel. The torque converter includes three fluid circuits arranged to enable independent operation of the associated clutches.

BACKGROUND

It is known to use a single torsional vibration damper or a series torsional vibration damper in a torque converter. The preceding configuration provides a torque path from a cover of the torque converter to an output of the torque converter through the damper configuration. In general, dampers are tuned according to the expected torque loads on the dampers. For example, the spring rates for the springs in a damper are selected according to the expected torque load. For lower torque loads, for example associated with two-cylinder mode, the spring rates must be relatively low and for greater torque loads, for example, for a four cylinder engine, the spring rates must be relatively higher. However, the preceding requirements create a conflict when the expected torque load on the damper includes too broad a range. For example, a four cylinder engine with a two cylinder mode requires the relatively higher spring rates noted above for operation in four-cylinder mode. However, the higher spring rates render the damper ineffectual for the two-cylinder mode. That is, due to the higher spring rates, the damper is too stiff in the two-cylinder mode and an undesirable amount of vibration passes through the damper.

U.S. Pat. No. 7,044,279 teaches the use of two clutches in a torque converter. However, U.S. Pat. No. 7,044,279 teaches a single damper. Therefore, regardless of the clutch closed, all vibration attenuation is linked to the spring rates of the single damper.

SUMMARY

According to aspects illustrated herein, there is provided a torque converter, including: a cover arranged to receive torque; a pump; a turbine hydraulically coupled to the pump and including a turbine shell; a turbine clutch including a radially outermost portion of the turbine shell; a first torsional vibration damper with a first input plate non-rotatably connected to the turbine shell, an output flange arranged to non-rotatably connect to an input shaft for a transmission, and a plurality of springs engaged with the first input plate or the output flange; a second torsional vibration damper including a second input plate, an output plate arranged to non-rotatably connect to the input shaft for the transmission, and at least one first spring engaged with the second input plate and the output plate; a lock-up clutch including an axially displaceable piston plate arranged to non-rotatably connect the cover and the second input plate; a first fluid circuit arranged to supply first pressurized fluid to open the turbine clutch; a second fluid circuit arranged to supply second pressurized fluid to close the turbine clutch or open the lock-up clutch; and a third fluid circuit arranged to supply third pressurized fluid to close the lock-up clutch.

According to aspects illustrated herein, there is provided a torque converter, including: a cover arranged to receive torque; a pump non-rotatably connected to the cover; a turbine including a turbine shell; a turbine clutch including a radially outermost portion of the turbine shell; a first torsional vibration damper including a first input plate non-rotatably connected to the turbine shell, a first cover plate, an output flange arranged to non-rotatably connect to an input shaft for a transmission, and a plurality of springs, each first spring in the plurality of springs engaged with at least one of the first input plate, the first cover plate, or the first output flange; a second torsional vibration damper including a second input plate, an output plate arranged to non-rotatably connect to the input shaft for the transmission, and a second spring engaged with the second input plate and the output plate; and a lock-up clutch including an axially displaceable piston plate arranged to non-rotatably connect the cover and the second input plate.

According to aspects illustrated herein, there is provided a torque converter, including: a cover arranged to receive torque; a pump non-rotatably connected to the cover; a turbine including a turbine shell; a turbine clutch including a radially outermost portion of the turbine shell; a first torsional vibration damper including a plurality of springs and an output flange arranged to non-rotatably connect to an input shaft for a transmission; a second torsional vibration damper including at least one spring and an output plate arranged to non-rotatably connect to the input shaft; a lock-up clutch; when the turbine clutch is closed, a first torque path from the turbine shell to the output flange through the first vibration damper; and when the lock-up clutch is closed, a second torque path, separate from the first torque path, from the cover to the output plate through the second vibration damper. The turbine clutch is arranged to be opened or closed while the lock-up clutch is open or closed or the lock-up clutch is arranged to be opened or closed while the turbine clutch is open or closed.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
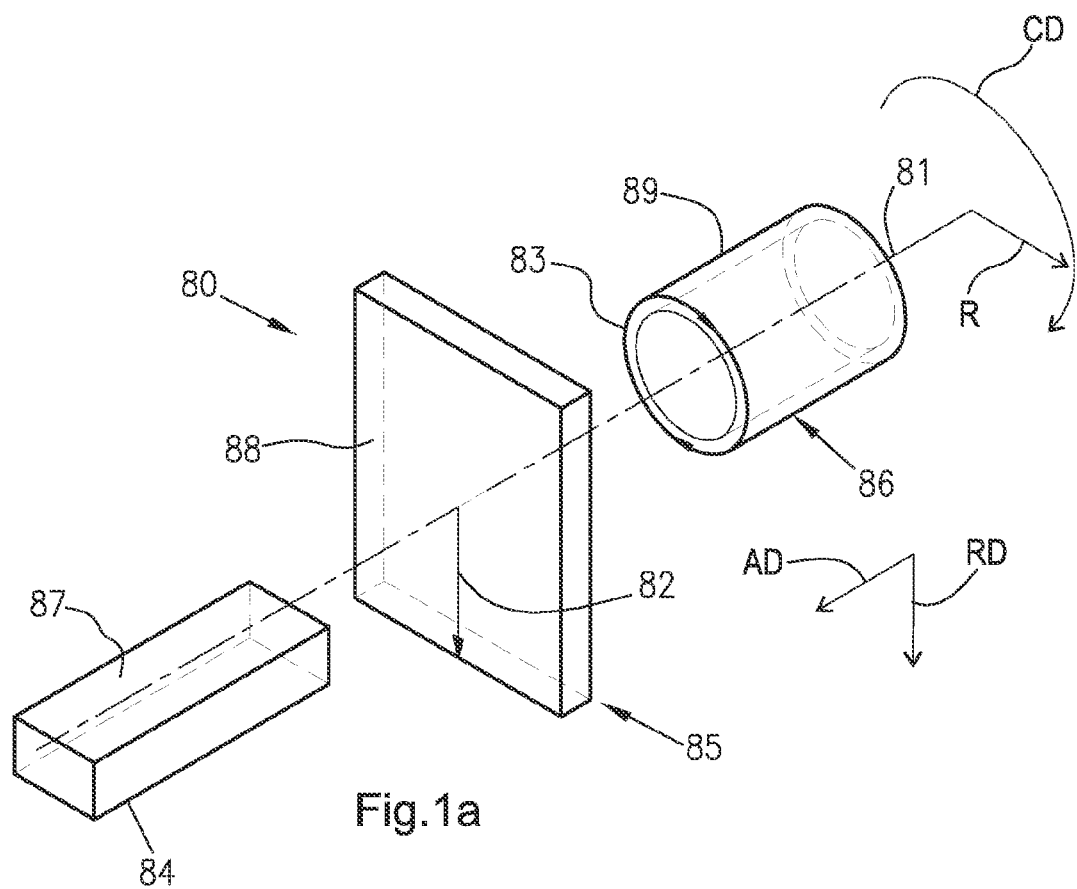
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. Axial direction AD is parallel to axis 81. Radial direction RD is orthogonal to axis 81. Circumferential direction CD is defined by an endpoint of radius R (orthogonal to axis 81) rotated about axis 81.

To clarify the spatial terminology, objects 84, 85, and 86 are used. Surface 87 of object 84 forms an axial plane. For example, axis 81 is congruent with surface 87. Surface 88 of object 85 forms a radial plane. For example, radius 82 is congruent with surface 88. Surface 89 of object 86 forms a circumferential surface. For example, circumference 83 is congruent with surface 89. As a further example, axial movement or disposition is parallel to axis 81, radial movement or disposition is orthogonal to axis 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
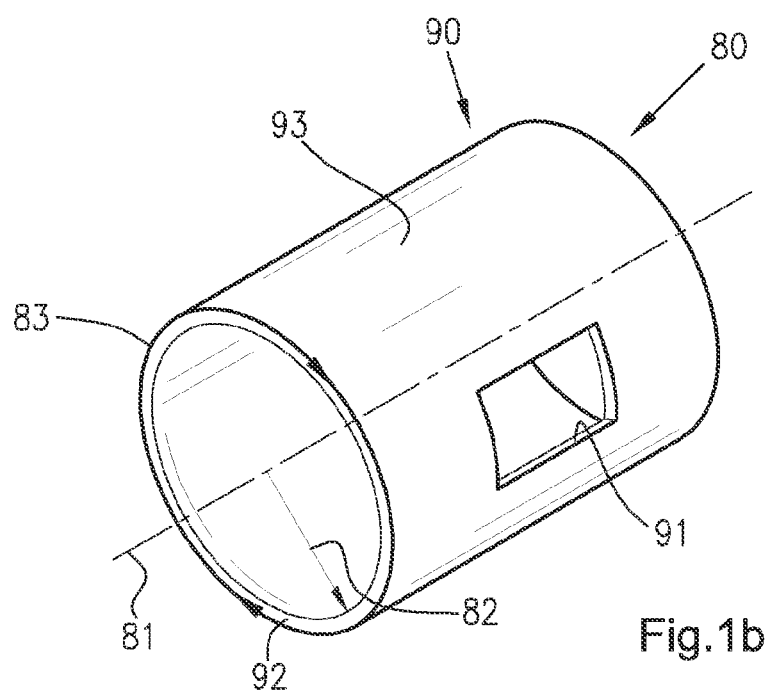
FIG. 1B is a perspective view of an object in the cylindrical coordinate system of FIG. 1A demonstrating spatial terminology used in the present application; and, FIG. 2 is a partial cross-sectional view of a torque converter with parallel torsional vibration dampers.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane and surface 92 is part of a radial plane.

Figure 2:
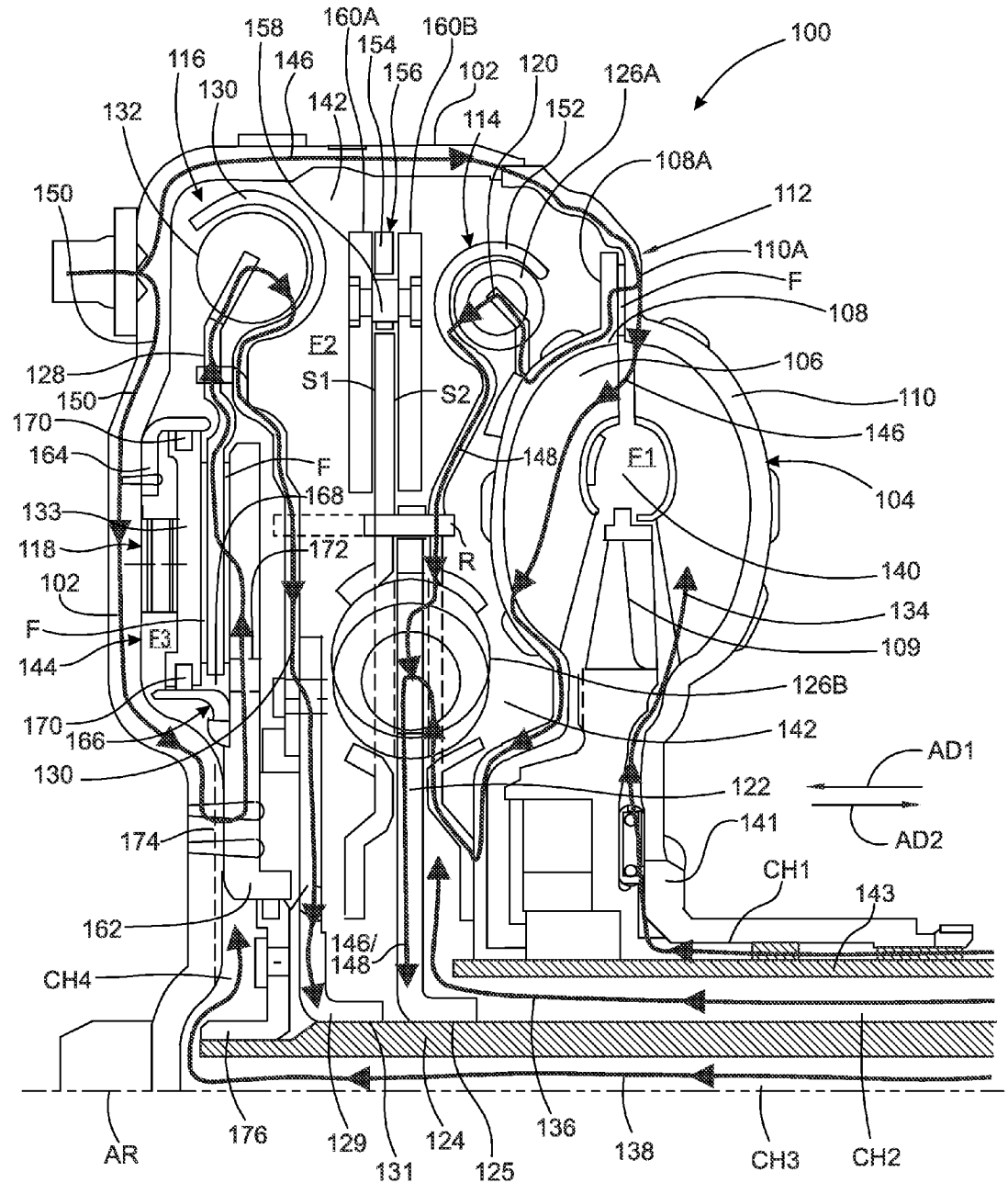

FIG. 2 is a partial cross-sectional view of torque converter 100 with parallel torsional vibration dampers. Torque converter 100 includes: axis of rotation AR; cover 102 arranged to receive torque, for example from an engine (not shown); pump 104 arranged to receive the torque from cover 102; turbine 106 including turbine shell 108; and stator 109 axially located between pump 104 and turbine 106. In an example embodiment, pump shell 110 for pump 104 is non-rotatably connected to cover 102. Torque converter 100 includes turbine clutch 112, torsional vibration damper 114, torsional vibration damper 116, and lock-up clutch 118. As is further described below, dampers 114 and 116 operate in parallel. That is, torque from cover 102 can be directed through damper 114 only, damper 116 only, or both dampers 114 and 116.

By "non-rotatably connected" components we mean that a first component is connected to a second component so that any time the first component rotates, the second component rotates with the first component, and any time the second component rotates, the first component rotates with the second component. Axial displacement between the first and second components is possible.

Clutch 112 includes radially outermost portion 108A of turbine shell 108, portion 110A of pump shell 110, and friction material F between portions 108A and 110A. Portion 108A is integrally formed with shell 108 as shown in FIG. 2 or in an embodiment not shown, is separate from shell 108 and non-rotatably connected to shell 108. Damper 114 includes: input plate 120 non-rotatably connected to turbine shell 108; output flange 122 arranged to non-rotatably connect to input shaft 124 for a transmission, for example, via spline connection 125; and springs 126A and 126B engaged with plate 120 or output flange 122. Damper 116 includes: input plate 128; output plate 130 arranged to non-rotatably connect to input shaft 124, for example via spline connection 131; and at least one spring 132 engaged with input plate 128 and output plate 130. In an example embodiment, output plate 130 is non-rotatably connected to connection plate 129. Lock-up clutch 118 includes axially displaceable piston plate 133 arranged to non-rotatably connect cover 102 and input plate 128.

Operation of turbine clutch 112 is independent of operation of lock-up clutch 118 and operation of lock-up clutch 118 is independent of operation of turbine clutch 112. For example, clutch 112 can be closed or opened while clutch 118 is open or closed, and clutch 118 can be closed or opened while clutch 112 is open or closed.

Torque converter 100 is a three-pass torque converter, for example, converter 100 includes three separately controllable fluid circuits 134, 136, and 138. Fluid circuit 134 is arranged to supply pressurized fluid F1 to torus/chamber 140 and to open turbine clutch 112. Fluid circuit 136 is arranged to supply pressurized fluid F2 to close turbine clutch 112 or open lock-up clutch 118. Fluid circuit 138 is arranged to supply pressurized fluid F3 to close lock-up clutch 118.

As further described below, circuits 134, 136, and 138 are controllable to: open or close turbine clutch 112 while opening or closing clutch 118 or while keeping lock-up clutch 118 open or closed; keep turbine clutch 112 open or closed while opening or closing clutch 118 or while keeping lock-up clutch 118 open or closed; open or close lock-up clutch 118 while opening or closing turbine clutch 112 or while keeping turbine clutch 112 open or closed; and keep lock-up clutch 118 open or closed while opening or closing turbine clutch 112 or while keeping turbine clutch 112 open or closed. In an example embodiment, circuits 134, 136, and 138 include channels CH1, CH2, and CH3, respectively. Channel CH1 is formed by pump hub 141 and stator shaft 143. Channel CH2 is formed primarily by shafts 124 and 143. CH3 is formed by a center bore in shaft 124.

In an example embodiment, torque converter 100 includes chambers 140, 142, and 144. Chamber 140 is a torus at least partially formed by pump 104 and turbine 106. Circuit 134 provides fluid F1 to chamber 140. Chamber 142 is at least partially formed by cover 102 and shell 108. Circuit 136 provides fluid F2 to chamber 142. Chamber 144 is at least partially formed by cover 102 and piston 133. Circuit 138 provides fluid F3 to chamber 144.

An example operation of torque converter 100 is as follows. To operate in torque converter mode, that is, to transmit torque from cover 102 to input shaft 124 through the fluid coupling of pump 104 and turbine 106 (create torque path 146), circuits 134, 136, and 138 are operated as follows. Pressure in chamber 140 is greater than pressure in chamber 142, displacing turbine 108 in axial direction AD1 and opening clutch 112. Pressure in chamber 142 is greater than pressure in chamber 144, displacing piston 133 in direction AD1 and opening clutch 118.

To operate in a first lock-up mode, that is, to transmit torque from cover 102 to input shaft 124 through damper 114 (create torque path 148), circuits 134, 136, and 138 are operated as follows. Pressure in chamber 142 is greater than pressure in chamber 140, displacing turbine 108 in axial direction AD2, frictionally engaging portions 108A and 110A and friction material F, and closing clutch 112. Pressure in chamber 142 is greater than pressure in chamber 144, displacing piston 133 in direction AD1 and opening clutch 118.

To operate in a second lock-up mode, that is, to transmit torque from cover 102 to input shaft 124 through damper 116 (create torque path 150), circuits 134, 136, and 138 are operated as follows. Pressure in chamber 140 is greater than pressure in chamber 142, displacing turbine 108 in axial direction AD1 and opening clutch 112. Pressure in chamber 144 is greater than pressure in chamber 142, displacing piston 133 in direction AD2 and closing clutch 118. In the second lock-up mode relative rotation between shell 108 and cover 102 is possible.

To operate in a combined first and second lock-up mode, that is, to simultaneously create torque paths 148 and 150, circuits 134, 136, and 138 are operated as follows. Pressure in chamber 142 is greater than pressure in chamber 140, displacing turbine 108 in axial direction AD2 and closing clutch 112. Pressure in chamber 144 is greater than pressure in chamber 142, displacing piston 133 in direction AD2 and closing clutch 118.

In an example embodiment, damper 114 includes cover plate 152 engaged with springs 126A and 126B. In torque converter mode, torque path 146 passes through shell 108 to shaft 124 through cover plate 152, spring 126B, and flange 122. In the first lock-up mode, torque path 148 passes from portion 108A to shaft 124 through plate 120, spring 126A, plate 152, spring 126B, and flange 122.

In an example embodiment, damper 114 includes: cover plate 154 non-rotatably connected to cover plate 152; and pendulum assembly 156 connected to plate 154. Assembly 156 includes: connecting element 158 passing through cover plate 154 and limitedly displaceable with respect to cover plate 154; and pendulum masses 160A and 160B. Masses 160A and 160B are disposed on opposite radial sides S1 and S2 of cover plate 154, connected to each other by element 158, and are displaceable with respect cover plate 154 by virtue of the connection to element 158.

In an example embodiment, clutch 118 includes friction material F and pressure plate 162 non-rotatably connected to cover 102. Input plate 128 is axially disposed between piston 133 and plate 162. Friction material F is located between piston 133 and plate 128 and between plates 128 and 162. When piston 133 is displaced in direction AD1, plate 128 is rotatable with respect to plate 162 and cover 102 (clutch 118 is open). When piston 133 is displaced in direction AD2, plate 128 and piston 133 are frictionally engaged via friction material F, plates 128 and 162 are frictionally engaged via friction material F, and plate 128 rotates with cover 102 (clutch 118 is closed).

In an example embodiment, clutch 118 includes outer carrier 164 non-rotatably connected to cover 102 and inner carrier 166 non-rotatably connected to plate 162. Piston 133 and input plate 128 are axially displaceable with respect to carrier 166, and rotationally fixed with respect to carrier 166, for example via spline connection 168. In an example embodiment, seals 170 seal chamber 144 from chamber 142 while enabling axial displacement of piston 133. In an example embodiment, plate 162 includes bore 172 to enable a quicker and more uniform distribution of fluid within chamber 142.

In an example embodiment, plate 130 is non-rotatably connected to damper 114, for example, rivet R is extended to plate 130. With the preceding arrangement, torque from plate 130 also passes through spring 126B and flange 122. That is, torque passing through either of clutches 112 or 118 passes through spring 126B. Thus, the combination of damper 116 and plate 152, spring 126B and flange 122 essentially operates as a conventional series damper.

In an example embodiment, torque converter 100 includes plate 176. Plate 176 and cover 102 form chamber CH4 connecting channel CH3 and chamber 144. Passage 174 connects chamber CH4 with chamber 144.

In an example embodiment (not shown), plate 129 is non-rotatably connected to flange 122 rather than terminating in a direct connection to input shaft 124. In an example embodiment (not shown), flange 122 is non-rotatably connected to plate 129 rather than terminating in a direct connection to input shaft 124.

Advantageously, the parallel operation capability enabled by clutch 112 and damper 114 and by clutch 118 and damper 116 resolve the problem noted above regarding vibration dampening for different torque loads, for example as associated with two-cylinder mode and four-cylinder operation. For example, the spring rates in one of damper 114 or 116 can be selected to be relatively lower to provide optimal dampening for lower torque loads, while the spring rates for the other of damper 114 or 116 can be selected to be higher for heavier torque loads. Further, a still higher torque load can be accommodated by operating both damper 114 and 116 in parallel. Fluid circuits 134, 136, and 138 and fluid chambers 140, 142, and 144 enable the independent operation of clutches 112 and 118, which enables the independent or parallel implementation of torque paths 148 and 150.

In addition, dampers 114 and 116 can be staged according to throttle positions for an engine supplying torque to converter 100 to accommodate the particular torque load associated with the throttle positions.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What I claim is:

1. A torque converter, comprising:
    a cover arranged to receive torque;
    a pump;
    a turbine hydraulically coupled to the pump and including a turbine shell;
    a turbine clutch including a radially outermost portion of the turbine shell;
    a first torsional vibration damper with:
        a first input plate non-rotatably connected to the turbine shell;
        an output flange arranged to non-rotatably connect to an input shaft for a transmission; and,
        a plurality of springs engaged with the first input plate or the output flange;
    a second torsional vibration damper including:
        a second input plate;
        an output plate arranged to non-rotatably connect to the input shaft for the transmission; and, at least one first spring engaged with the second input plate and the output plate;
a lock-up clutch including an axially displaceable piston plate arranged to non-rotatably connect the cover and the second input plate;
a first fluid circuit arranged to supply first pressurized fluid to open the turbine clutch;
a second fluid circuit arranged to supply second pressurized fluid to close the turbine clutch or open the lock-up clutch; and,
a third fluid circuit arranged to supply third pressurized fluid to close the lock-up clutch.

2. The torque converter of claim 1, wherein the first, second, and third fluid circuits are controllable to:
close the turbine clutch while keeping the lock-up clutch open or closed; or,
open the turbine clutch while keeping the lock-up clutch open or closed.

3. The torque converter of claim 1, wherein the first, second, and third fluid circuits are controllable to:
close the lock-up clutch while keeping the turbine clutch open; or,
open the lock-up clutch while keeping the turbine clutch closed.

4. The torque converter of claim 1, wherein the first, second, and third fluid circuits are controllable to:
close the turbine clutch while closing the lock-up clutch or opening the lock-up clutch; or,
open the turbine clutch while closing the lock-up clutch or opening the lock-up clutch.

5. The torque converter of claim 1, wherein the first, second, and third fluid circuits are controllable to:
close the lock-up clutch while closing the turbine clutch or opening the turbine clutch; or,
open the lock-up clutch while closing the turbine clutch or opening the turbine clutch.

6. The torque converter of claim 1, wherein the first, second, and third fluid circuits are controllable to:
simultaneously open or close the turbine clutch and the lock-up clutch; or,
keep the turbine clutch and the lock-up clutch simultaneously open or closed.

7. The torque converter of claim 1, wherein:
the first, second, and third fluid circuits are controllable to create a torque path from the cover to the output flange while isolating the second input plate from the cover; or,
the first, second, and third fluid circuits are controllable to create a torque path from the cover to the output plate while enabling relative rotation between the turbine shell and the cover.

8. The torque converter of claim 1, wherein the first, second, and third fluid circuits are controllable to simultaneously create:
a first torque path from the cover to the output flange through the turbine clutch; and,
a second torque path, separate from the first torque path, from the cover to the output plate through the lock-up clutch.

9. The torque converter of claim 1, further comprising:
a first chamber at least partially formed by the pump and the turbine; and,
a second chamber at least partially formed by the cover and the turbine shell, wherein:
the first fluid circuit is arranged to provide the first pressurized fluid to the first chamber; and,
the second fluid circuit is arranged to provide the second pressurized fluid to the second chamber.

10. The torque converter of claim 1, further comprising:
a first chamber at least partially formed by the cover and the turbine shell; and,
a second chamber at least partially formed by the cover and the axially displaceable piston plate, wherein:
the second fluid circuit is arranged to provide the second pressurized fluid to the first chamber; and,
the third fluid circuit is arranged to provide the third pressurized fluid to the second chamber.

11. The torque converter of claim 10, wherein the second chamber is sealed from the first chamber.

12. The torque converter of claim 1, wherein:
the first torsional vibration damper includes a first cover plate;
the plurality of springs includes second and third springs;
first input plate and the first cover plate are engaged with the second spring; and,
the first cover plate and the output flange are engaged with the third spring.

13. The torque converter of claim 1, wherein:
the second torsional vibration damper includes a pressure plate non-rotatably connected to the cover; and,
at least a portion of the first input plate is axially located between the axially displaceable piston plate and the pressure plate.

14. A torque converter, comprising:
a cover arranged to receive torque;
a pump non-rotatably connected to the cover;
a turbine including a turbine shell;
a turbine clutch including a radially outermost portion of the turbine shell;
a first torsional vibration damper including:
a first input plate non-rotatably connected to the turbine shell;
a first cover plate;
an output flange arranged to non-rotatably connect to an input shaft for a transmission; and,
a plurality of springs, each first spring in the plurality of springs engaged with at least one of the first input plate, the first cover plate, or the output flange;
a second torsional vibration damper including:
a second input plate;
an output plate arranged to non-rotatably connect to the input shaft for the transmission; and,
a second spring engaged with the second input plate and the output plate; and,
a lock-up clutch including an axially displaceable piston plate arranged to non-rotatably connect the cover and the second input plate, wherein:
operation of the turbine clutch is independent of operation of the lock-up clutch; and,
operation of the lock-up clutch is independent of operation of the turbine clutch.

15. The clutch of claim 14, further comprising:
a first fluid circuit arranged to supply first pressurized fluid to open the turbine clutch;
a second fluid circuit arranged to supply second pressurized fluid to close the turbine clutch or open the lock-up clutch; and,
a third fluid circuit arranged to supply third pressurized fluid to close the lock-up clutch.

16. The torque converter of claim 15, wherein the first, second, and third fluid circuits are controllable to:

create a first torque path from the cover to the output flange while isolating the second input plate from the cover; or, create a second torque path from the cover to the output plate while enabling relative rotation between the turbine shell and the cover; or, simultaneously create:
  the first torque path from the cover to the output flange through the first vibration damper; and,
  the second torque path from the cover to the output plate through the second vibration damper.

17. The torque converter of claim 15, further comprising:
a first chamber at least partially formed by the pump and the turbine and connected to the first fluid circuit;
a second chamber at least partially formed by the cover and the turbine shell and connected to the second fluid circuit; and,
a third chamber at least partially formed by the cover and the axially displaceable piston plate and connected to the third fluid circuit.

18. A torque converter, comprising:
a cover arranged to receive torque;
a pump non-rotatably connected to the cover;
a turbine including a turbine shell;
a turbine clutch;
a first torsional vibration damper including a plurality of springs and an output flange arranged to non-rotatably connect to an input shaft for a transmission;
a second torsional vibration damper including at least one spring and an output plate arranged to non-rotatably connect to the input shaft;
a lock-up clutch;
when the turbine clutch is closed, a first torque path from the turbine shell to the output flange through the first vibration damper; and,
when the lock-up clutch is closed, a second torque path, separate from the first torque path, from the cover to the output plate through the second vibration damper.

19. The torque converter of claim 18, wherein:
the turbine clutch and the lock-up clutch are arranged to be simultaneously open or simultaneously closed; or,
the turbine clutch is arranged to be opened or closed while the lock-up clutch is open or closed; or,
the lock-up clutch is arranged to be opened or closed while the turbine clutch is open or closed.

* * * * *